UNITED STATES PATENT OFFICE.

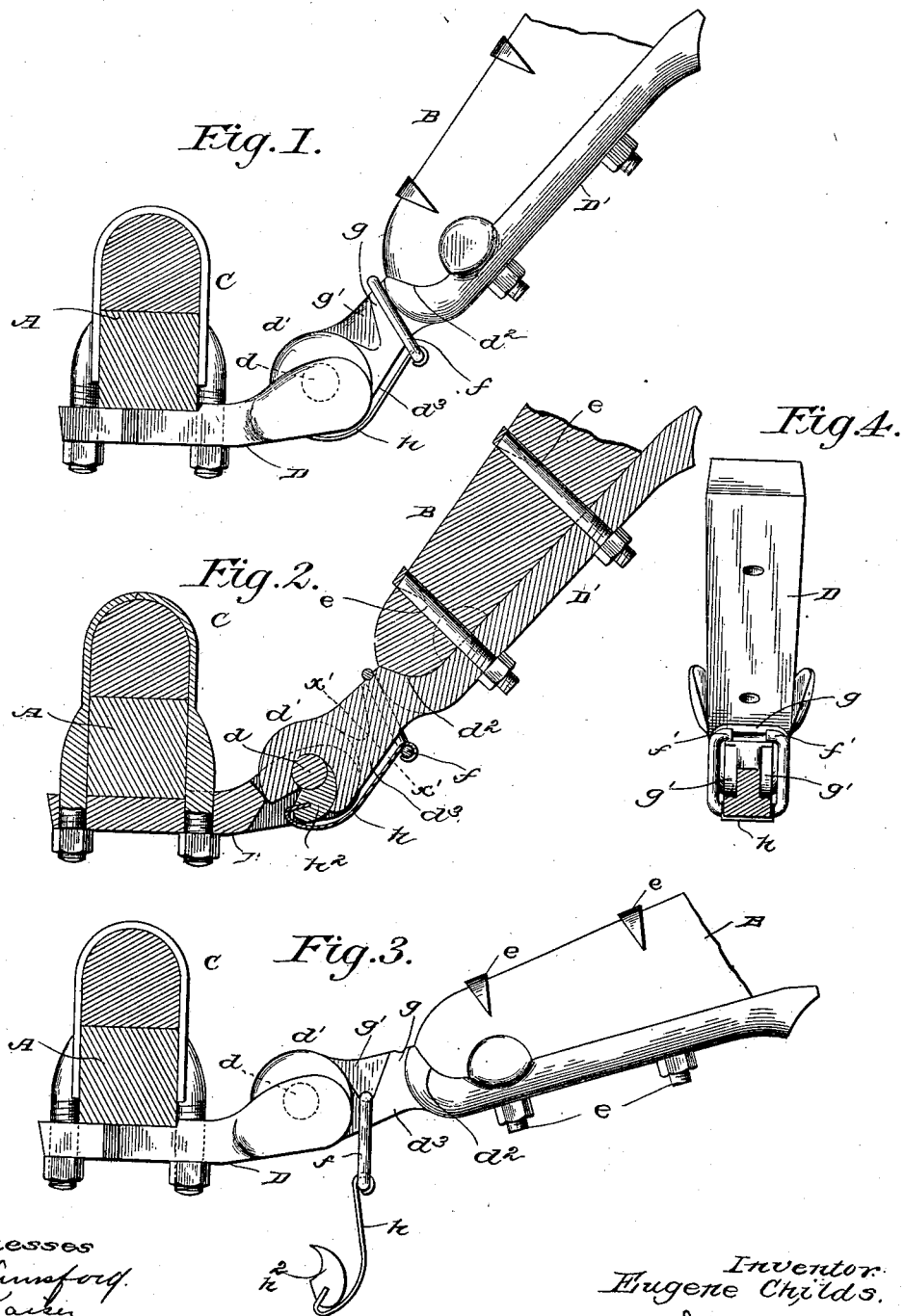

EUGENE CHILDS, OF BOSTON, MASSACHUSETTS, ASSIGNOR TO TRIMONT MANUFACTURING COMPANY, OF SAME PLACE AND PORTLAND, MAINE.

COUPLING FOR POLES OR SHAFTS.

SPECIFICATION forming part of Letters Patent No. 672,871, dated April 23, 1901.

Application filed December 7, 1900. Serial No. 38,993. (No model.)

*To all whom it may concern:*

Be it known that I, EUGENE CHILDS, a citizen of the United States, residing at Boston, county of Suffolk, State of Massachusetts, have invented an Improvement in Couplings for Shafts or Poles of Carriages, of which the following description, in connection with the accompanying drawings, is a specification, like letters on the drawings representing like parts.

This invention has for its object the production of an antirattling coupling which may be readily uncoupled from the carriage when the latter is not in use or for changing from shafts to pole, or vice versa.

The coupling herein shown is composed of two main members, one to be affixed to the axle of the carriage and the other to the shaft or pole, one of said members having a draft-stud and the other a hook partially embracing the same, the space between a part of said stud and the inner side of the hook receiving a wedge having a connected spring to force said wedge snugly in place, the wedge taking up and compensating for wear of the parts and preventing rattling.

The invention herein to be described lies chiefly in the construction of the spring connected with the wedge and the manner of connecting said spring with the member of the coupling attached to the shaft or pole. Prior to this invention the free end of the spring has been made to enter sidewise a slot in a fastening device projecting below the under side of the member connected with the shaft and located at a considerable distance above the lower end of the shaft, said slot having at one side a notch in which the narrow end of the spring enters and is held in locked position. In practice the employment of a fastening extended below the shaft member is objectionable, because it is liable to be bent or broken off by a blow, and the employment of a fastening having an open slot is unsafe, for any blow to knock the spring from the slot frees the coupling. Further, by locating the fastening at a point on the shaft member above the inner end of the shaft necessitates a long spring, and to enable the spring to enter the notch referred to it was reduced in width and weakened. In my improved coupling the spring at the end carrying the wedge may be substantially of the width of the wedge, and the length of the spring is so reduced that its end farthest from the wedge when the coupling is operative falls short of the end of the shaft. The free end of the spring is shown as bent to form a hook to engage a loose bail or loop embracing a neck of the shaft member, said neck being located between the eye of the shaft member embracing the stud or pintle and a shoulder which defines the position of the inner end of the shaft. The neck has a seat to maintain the bail or loop in its operative position and a cast-off space to receive ears of said bail or loop when in its inoperative position. The bail is at all times connected with the shaft member, so that the spring connected with the bail is always at the shaft member ready for use.

Figure 1 in side elevation shows one of my improved couplings applied to an axle and shaft; Fig. 2, a like view with the coupling-shaft and axle in section. Fig. 3 shows the wedge and spring in their inoperative positions; and Fig. 4, a section in the line $x'$, Fig. 2.

In the drawings, A represents part of an axle, B part of a shaft, or it may be part of a pole, and C an axle-clip, all of usual construction. The clip enters holes in and is used to confine in position the axle member D of the coupling, it having, as shown, a stud or pintle $d$, the other or shaft member D' of the coupling having an eye $d'$, slotted to engage said stud, being shown as connected with said shaft or pole by suitable bolts $e$. The shaft member has an abutment $d^2$, which receives against it the end of the shaft B, and between said abutment and the external part of the eye $d'$ said shaft member has a neck $d^3$, which is straddled by a bail or loop $f$, having at one end ears $f'$. (See Fig. 4.) The neck $d^3$ has a seat $g$, provided with a groove, which is entered by the ears of the loop when the coupling is in its operative position, (see Figs. 1 and 2,) and between said seat and the eye $d'$ the neck has opposite cast-off pockets $g'$, in which the ears of the bail or loop may enter when the coupling is in its inoperative position. (See Fig. 3.) The bail or loop has pivotally connected with it a short stiff spring $h$ by, as herein shown, bending the end of the spring to embrace part of the bail or loop. The other end of the spring $h$ has fixed to it a wedge $h^2$ of usual construction, said wedge being interposed between the stud $d$ and the inner face of the eye $d'$, as shown in Fig. 2, when the coupling is in its operative position.

To detach the coupling, it is only necessary to pinch the neck and spring to thus relax the downward pressure of the spring on the bail, when the ears of the bail may be slipped laterally from the seat and enter the pockets, and thereafter the spring $h$ may be engaged and the wedge be withdrawn from the position Fig. 2, the spring and wedge dropping, as in Fig. 3, but being held connected with the shaft member by the bail or loop. With the wedge removed the shaft member may be lifted from its engagement with the stud $d$ and the shaft, detached from the carriage, may be set aside.

Having described my invention, what I claim as new, and desire to secure by Letters Patent, is—

1. In a coupling of the class described, an axle member and a shaft member, said members being provided with an interlocking stud and eye, a wedge, a spring constituting the sole support for said wedge in both its operative and inoperative positions, and a bail loosely sustained by and movable on the shaft member to sustain said spring and wedge in said positions.

2. In a coupling of the class described, a shaft member having an eye and a neck, said neck being provided with a seat and also pockets, combined with a spring, and a bail with which said spring is connected, said bail having a part embracing said neck and sustained by said seat to hold the wedge in operative position, and movable on the neck to engage the pockets when the wedge is in its inoperative position.

3. In a coupling of the class described, a shaft member having an eye and a neck, an axle member having a stud to be engaged by said eye, a wedge, a bail loosely embracing said neck of the shaft member, the said neck being provided with a seat and with pockets, the said bail being bodily movable on the neck into either the seat or the pockets, and a spring connecting said bail and wedge to sustain the wedge from the bail in both operative and inoperative position.

In testimony whereof I have signed my name to this specification in the presence of two subscribing witnesses.

EUGENE CHILDS.

Witnesses:
GEO. W. GREGORY,
EDITH M. STODDARD.